Dec. 9, 1930.                B. F. MEADOR                1,784,639
                             CONTROL SYSTEM
                           Filed Feb. 7, 1929
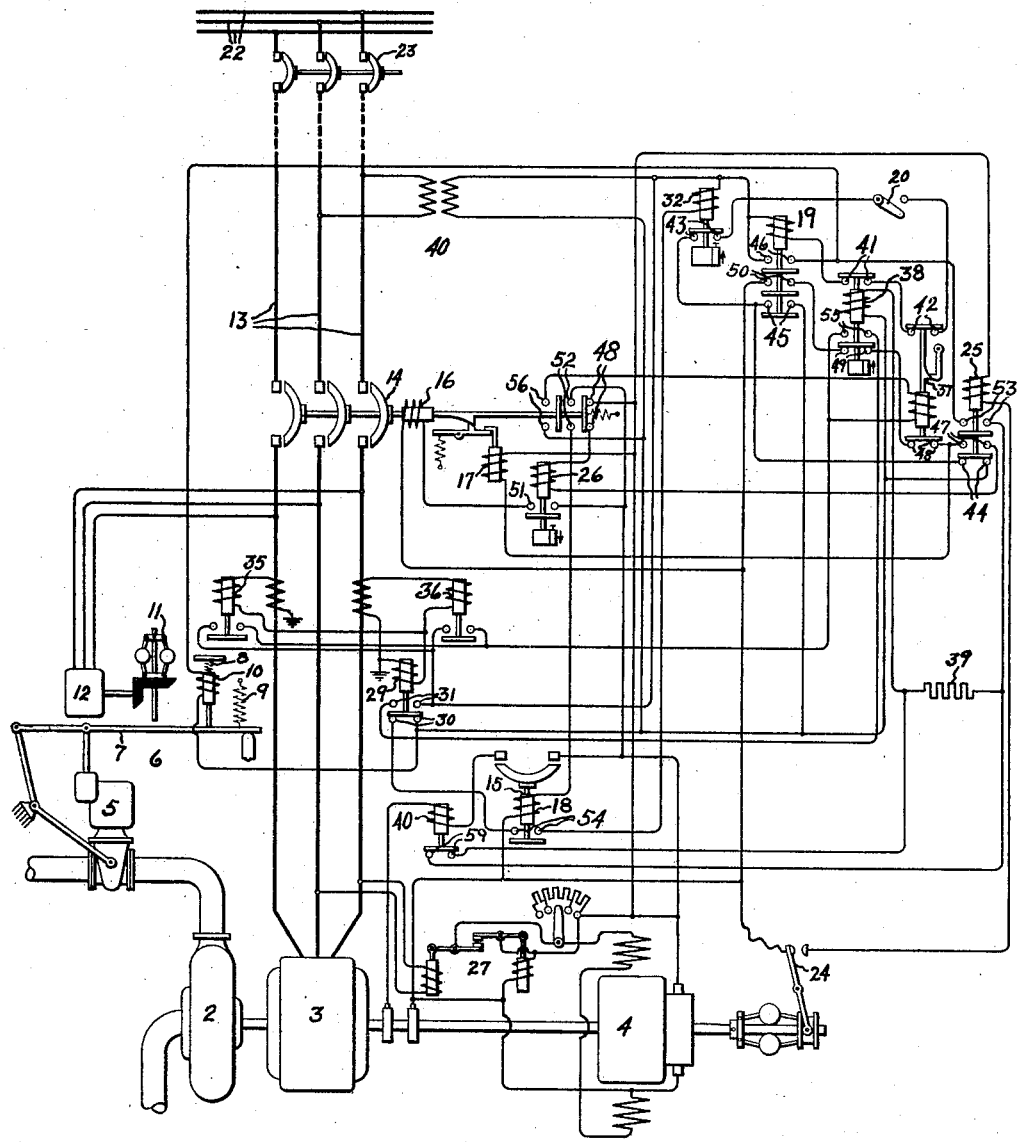
Inventor:
Barclay F. Meador
by Charles E. Tullar
His Attorney Patented Dec. 9, 1930

1,784,639

UNITED STATES PATENT OFFICE

BARCLAY F. MEADOR, OF KANSAS CITY, MISSOURI, ASSIGNOR TO GENERAL ELECTRIC COMPANY, A CORPORATION OF NEW YORK

CONTROL SYSTEM

Application filed February 7, 1929. Serial No. 338,267.

My invention relates to control systems and particularly to a system for controlling the connection between a generator of an automatic station and the load circuit supplied thereby and its object is to provide an arrangement whereby the occurrence of a predetermined abnormally high station voltage, which under predetermined operating conditions merely effects the shutting down of the station, also effects, under other predetermined operating conditions, the operation of means which prevents the subsequent automatic restarting of the station.

In automatic stations in which the generator is provided with an automatic voltage regulator a sudden decrease in the station load, due for example to an interruption in the load circuit supplied thereby, may cause the station voltage to increase to an abnormally high value. Under such conditions it is desirable merely to shut the station down and then automatically restart the station. In such an automatic station however an abnormally high station voltage may also occur due to a regulator failure and under such a condition it is desirable to shut the station down and prevent the subsequent automatic restarting thereof. In accordance with my invention, I provide an arrangement whereby the station is automatically shut down when an abnormally high station voltage occurs due to a sudden decrease in the load supplied thereby and is automatically shut down and prevented from being automatically restarted when an abnormally high station voltage occurs due to a regulator failure.

My invention will be better understood from the following description when taken in connection with the accompanying drawing, which shows diagrammatically a control system for an automatic generating station embodying my invention, and its scope will be pointed out in the appended claims.

Referring to the drawing, 1 represents a prime mover dynamo electric plant comprising a waterwheel 2 driving a generator 3 and an exciter 4. The supply of water to the waterwheel 2 may be controlled in any suitable manner, such as by means of a gate 5 the opening of which is controlled during the operation of the plant by a suitable speed responsive device such as a fly ball governor 6. As diagrammatically shown in the drawing, the governor comprises a movable member 7 which is arranged in a suitable manner so that the position thereof determines the opening of the gate 5. The member 7 is shown in the gate-closed position, in which position it is held by a closing spring 8 against the bias of an opening spring 9. When it is desired to open the gate 5 to start the waterwheel 2, the closing spring 8 is moved out of operative relation with the member 7 so that the opening spring 9 is free to move the member 7 upwardly and effect the opening of the gate. As shown, a magnet 10 is provided for moving the spring 8 out of operative relation with the member 7.

In order to control the position of the member 7 so as to maintain the speed of the waterwheel 2 at a predetermined value while the plant is in operation, suitable means responsive to the speed of the waterwheel is provided. As shown, this means comprises the fly-balls 11 which are driven by a motor 12 energized by the generator 3 so that its speed varies with the frequency of the generator which, in turn, varies with the speed of the waterwheel. The fly-balls 11 are arranged so that when the frequency of the generator 3 is above a predetermined value they move the member 7 against the bias of the spring 9 to effect a decrease in the amount of water supplied to the waterwheel 2 and when the frequency of the generator is below a predetermined value they permit the spring 9 to move the member 7 so as to effect an increase in the amount of water supplied to the waterwheel 2.

The generator 3 is arranged to be connected to an electric circuit 13 by means of a suitable switch 14 and the exciter 4 is arranged to be connected to the generator field winding by a suitable switch 15. The switches 14 and 15 may be of any suitable type examples of which are well known in the art. As shown, the switch 14 is of the latched-in type and is provided with a closing coil 16 and a low voltage trip coil 17, and the switch 15 is a contactor which is provided with a closing coil 18.

Any suitable control arrangement, examples of which are well known in the art, may be provided for normally controlling the operation of the magnet 10 and the switches 14 and 15 to start and stop the automatic station. As shown, I have provided a master relay 19 for controlling the starting and stopping of the station. Any suitable control means such as a hand switch 20 may be provided for controlling the energizing circuit of the relay 19. As shown the relay 19 is arranged to be connected across the circuit 13 when the switch 20 is closed so that the plant 1 may be started from a remote point by maintaining switch 20 closed and energizing the circuit 13 at some other point. For example, the circuit 13 may be the line between the automatic station 1 and a manual station where the circuit 13 is arranged to be connected to and disconnected from a separately energized load bus 22 by a suitable switch 23.

When the master relay 19 is energized it in turn, completes an energizing circuit for the governor magnet 10 to effect the opening of the gate 5 and the starting of the waterwheel 2.

In order that the generator may be connected to the circuit 13 and brought into synchronism therewith after the waterwheel has accelerated the generator to substantially synchronous speed I provide a suitable speed responsive device 24 which is arranged to effect the energization of a suitable control relay 25 when the speed of the generator 3 is above a predetermined value. The control relay 25, when energized, effects the completion of an energizing circuit for a control relay 26 which in turn completes an energizing circuit for the closing coil 16 of the switch 14 so that the generator 3 is connected to the circuit 13 while the generator field winding is unexcited. As soon as the switch 14 closes, auxiliary contacts thereon complete an energizing circuit for the closing coil 18 of the switch 15 so that the exciter 4 is connected to the generator field winding to cause the generator to pull into synchronism with the circuit 13.

After the generator is connected to the circuit 13 the generator voltage is regulated by means of a suitable automatic voltage regulator 27 examples of which are well known in the art. As diagrammatically shown the regulator is of the well-known Tirrill type which controls the shunt field excitation of the exciter 4 in response to the voltage of the generator 3.

As soon as the generator begins to supply current to the circuit 13 a current responsive relay 29 which is connected in any suitable manner so as to be responsive to the current output of the generator opens its contacts 30 and closes its contacts 31. As long as the current output of the generator is above a predetermined value, the current responsive relay 29 maintains its contacts 31 closed. When, however, it is desired to shut the automatic station down, the switch 23 at the remote station is opened so as to disconnect the load from the generator 3. The current through the relay 29 then decreases to a value which causes the current relay 29 to open its contacts 31 and close its contacts 30, thereby completing an energizing circuit for a time delay stopping relay 32. This relay 32 is arranged to effect the deenergization of the master relay 19 after the coil of the relay 32 has been energized for a predetermined length of time. The deenergization of the master relay 19 effects the opening of the switch 14 by opening the circuit of the low voltage release coil 17 which is completed when the master relay 19 is in its energized position. The opening of the switch 14 effects the deenergization of the closing coil 18 of the switch 15 so that the exciter 4 is disconnected from the generator field winding.

In order that the automatic station may be shut down and locked out in response to a predetermined overload I provide the current responsive relays 35 and 36 which are connected in any suitable manner so that they are respectively energized in accordance with the currents in different phases of the circuit 13. Each of these relays is arranged to complete an energizing circuit for a lockout relay 37 when the current in the respective phase exceeds a predetermined value. The lockout relay 37 is connected and arranged in such a manner that when it is energized it opens contacts in the energizing circuit of the master relay 19 and the master relay cannot be reenergized until the contacts of the lockout relay have been reset manually.

For effecting the shutting down of the automatic station in response to an abnormally high station voltage, I provide an overvoltage relay 38 which is arranged to be connected across one phase of the circuit 13 so that it is responsive to the station voltage while the automatic station 1 is in operation. The overvoltage relay 38 is arranged so that during the normal operation of the station the relay operates to effect the deenergization of the master relay 19 only when the station voltage exceeds a predetermined value. In order that the relay 38 may also be operated to effect the shutting down of the station in response to a predetermined abnormal condition such as a failure of the generator field circuit while the automatic station voltage is normal, I provide a field relay 40 in the generator field circuit which is arranged to short-circuit an impedance, such as a resistor 39, which is in series with the coil of the relay 38, when the generator field current is below a predetermined value. When the resistor 39 is short-circuited, the normal voltage of the generator is sufficient to operate the relay 38 and thereby effect the deenergization of the master relay 19 and the shutting down of the automatic station.

In order that the automatic station may be shut down and locked out in response to an abnormally high station voltage which is caused by a regulator failure and in response to a failure of the generator excitation while the station is in operation, and may be shut down and not locked out when an abnormally high station voltage occurs due to an opening of the switch 23 or any other interruption of the current being supplied by the generator 3, I provide in accordance with my invention an arrangement whereby the lockout relay 37 is energized when the abnormally high voltage is due to a regulator failure or a failure of generator excitation while the station is in operation and is not energized when the abnormally high station voltage is due to a decrease in the load supplied by the station. I accomplish this result by arranging the overvoltage relay 38 and the current responsive relay 29 so that when overvoltage relay 38 operates and the generator is supplying or receiving sufficient current to maintain the contacts 31 of the current relay 29 closed, a circuit is completed for the lockout relay 38. Preferably, the overvoltage relay 38 is designed in any suitable manner so that it has a longer time of operation than the current relay 29 so that the current relay 29 has sufficient time to open its contacts 31 before the relay 38 can complete the energizing circuit of the lockout relay 37 when an abnormally high station voltage occurs due to a decrease in the load connected to the station.

The operation of the arrangement shown in the drawing is as follows:

When the operation of the automatic station 1 is controlled from the remote station, the control switch 20 is normally maintained in its closed position. When it is desired to start the automatic station, the switch 23 at the remote station is closed to energize the circuit 13. An energizing circuit is then completed for the master relay 19. This circuit is from one secondary terminal of a control transformer 40, the primary of which is connected to one phase of the circuit 13, through the coil of the master relay 19, contacts 41 of the overvoltage relay 38, contacts 42 of the lockout relay 37, control switch 20, contacts 43 of the stopping relay 32, contacts 44 of the speed responsive relay 25 to the other secondary terminal of the transformer 40. The master relay 19, by closing its contacts 45, completes a locking circuit for itself which is independent of the contacts 44 of the speed responsive relay 25 so that the master relay is not deenergized in response to the energization of the speed responsive relay 25 when the generator reaches approximately synchronous speed.

The master relay 19 by closing its contacts 46 completes an energizing circuit for the magnet 10 across the secondary of the transformer 40 so that the opening of the gate 5 and the starting of the waterwheel 2 is effected.

As soon as the generator 3 has accelerated to approximately synchronous speed the speed switch 24 closes and completes an energizing circuit for the speed responsive relay 25 across the exciter 4. As soon as the exciter voltage has built up to a predetermined value, relay 25 closes its contacts 47 and completes an energizing circuit for the hestitating control relay 26. This circuit is from one terminal of the exciter through the auxiliary contacts 48 on the switch 14, coil of the relay 26, contacts 47 of the relay 25, contacts 48 of the lockout relay 37, contacts 49 of the overvoltage relay 38, contacts 50 of the relay 19 to the other terminal of the exciter 4. The control relay 26 by closing its contacts 51 completes across the exciter an energizing circuit for the closing coil 16 of the switch 4 so that the switch 14 is closed to connect the generator 3 to the circuit 13. As soon as the switch 14 closes, an energizing circuit for the closing coil 18 of the switch 15 is completed across the exciter through the auxiliary contacts 52 on the switch 14. The energization of the closing coil 18 closes the switch 15 so that the exciter 4 is connected to the generator field winding to pull the generator 3 into synchronism with the circuit 13.

As soon as the switch 14 closes, the control relay 26 is deenergized and after a predetermined time opens its contacts 51 and effects the deenergization of the closing coil 16. The switch 14, however, remains closed as the low voltage release coil 17 is energized from the exciter 4 through a circuit which includes the contacts 48' of the lockout relay 37, contacts 49 of the overvoltage relay 38 and the contacts 50 of the master relay 19.

While the automatic station is in operation the voltage regulator 27 regulates the shunt field excitation of the exciter in such a manner as to maintain a predetermined generator voltage. As long as the station voltage remains below a predetermined value the overvoltage relay 38 which is connected across the secondary of the transformer 40 by the contacts 46 of the master relay 19 and the contacts 53 of the speed responsive relay 25 remains in the position shown in the drawing.

When it is desired to shut the automatic station down the switch 23 at the remote station is opened so that the current output of the generator 3 decreases to a value which causes the current responsive relay 29 to open its contacts 31 and close its contacts 30. The closing of the contacts 30 of the relay 29 completes, across the secondary terminals of the transformer 40, an energizing circuit for the time delay stopping relay 32. This circuit also includes the auxiliary contacts 54 on the switch 15. After the coil of the relay 32 has been energized for a predetermined time, the relay 32 opens its contacts 43 in the heretofore traced energizing circuit of the master relay 19. The master relay 19 by opening its contacts 46 deenergizes the magnet 10 to effect the closing of the gate 5 and by opening its contacts 50 effects the deenergization of the low voltage release magnet 17 so that the switch 14 opens to disconnect the generator 3 from the circuit 13. As soon as the switch 14 opens its auxiliary contacts 52 the heretofore traced circuit for the closing coil 18 is interrupted to effect the opening of the switch 15.

If the generator 3 is supplying a large current at the time the switch 23 is opened, the sudden decrease in the load connected to the generator 3 may cause the voltage of the generator to increase sufficiently to operate the overvoltage relay 38. Any other sudden interruption of the current output of the generator 3 may effect the operation of the overvoltage relay 38. The operation of the overvoltage relay 38 under such conditions however does not effect the energization of the lockout relay 37 because the current relay 29 opens its contacts 31 before the relay 41 can close its contacts 55. If, however, the regulator 27 should fail while the generator 3 is supplying current to the circuit 13 so that the overvoltage relay 38 closes its contacts 55 while the contacts 31 of the current relay 29 are closed, an energizing circuit is completed for the lockout relay 37. The circuit is from one secondary terminal of the transformer 40 through contacts 31 of the current relay 29, contacts 55 of the overvoltage relay 38, winding of lockout relay 37, auxiliary contacts 56 of switch 14 to the other secondary terminal of the transformer 40. The lockout relay 37 by opening its contacts 42 interrupts the heretofore traced circuit for the master relay 19 to effect the shutting down of the automatic station 1. Since the contacts 42 of the lockout relay 37 have to be manually reset, the automatic station is locked out until an operator has reset these contacts.

It will be observed that a failure in the generator excitation while the automatic station is in operation causes a similar shutting down and locking out of the station. When the generator field current decreases below a predetermined value the field relay 40 closes its contact 59 and thereby short circuits the resistor 39 so that the normal station voltage causes the operation of the overvoltage relay 38. The relays 38 and 29 then effect the operation of the lockout relay 37 in the manner heretofore described since sufficient current will be flowing through the generator 3 to maintain the contacts 31 of relay 29 closed.

It will be observed therefore that in accordance with my invention I have provided an arrangement whereby the automatic station is automatically shut down if the overvoltage relay is operated while the current supplied by or to the station is below a predetermined value and the station is automatically shut down and locked out if the overvoltage relay is operated while the current supplied by or to the station is above a predetermined value.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an automatic generating station, control means for effecting the starting of said station, means responsive to a predetermined abnormally high voltage of said station for effecting the shutting down of said station, and means controlled by said voltage responsive means and a predetermined operating condition of said station for preventing said control means from effecting the subsequent restarting of station when said predetermined abnormally high voltage occurs while said predetermined operating condition of said station exists.

2. In combination, an automatic generating station including a generator, a voltage regulator therefor, and control means for effecting the starting of said generator, means responsive to a predetermined abnormally high voltage of said station for effecting the shutting down of said station, and means controlled by said voltage responsive means and an electric condition of said generator which is controlled by said regulator for preventing said control means from effecting the subsequent restarting of said station when said predetermined abnormally high voltage occurs due to a failure of said regulator.

3. In combination, an automatic generating station, control means for effecting the starting of said station, means responsive to a predetermined abnormally high voltage of said station for effecting the shutting down thereof, and means controlled by said voltage responsive means and the current output of said station for preventing the subsequent restarting of said station from being effected by said control means when said predetermined abnormally high voltage occurs while the current output of the station is above a predetermined value.

4. In combination, a source of current, a load circuit, a control device, automatic switching means controlled by said device for effecting the connection of said source to said circuit when said device is in a predetermined position, means controlled by the voltage of said source and a predetermined condition of said source for effecting the disconnection of said source from said circuit and for removing said automatic switching means from the control of said control device when an abnormal source voltage occurs under certain conditions of said source and for effecting only the disconnection of said source from said circuit when said abnormal source voltage occurs under other conditions of said source.

5. In combination, a load circuit, a generator connected to said circuit, a voltage regulator for said generator, automatic switching means for controlling the connection between said generator and load circuit, and means controlled by the voltage and current output of said generator for effecting the operation of said automatic switching means to disconnect said generator from said circuit and to render said automatic switching means inoperative to reconnect said generator to said circuit when a predetermined abnormal voltage occurs due to a failure of said regulator and for effecting only the operation of said automatic switching means to disconnect said generator from said circuit when said predetermined abnormal voltage occurs due to a sudden decrease in load demand on said circuit.

6. In combination, a load circuit, a generator, a voltage regulator for said generator, automatic switching means for controlling the connection between said generator and said circuit including a master relay arranged when energized to effect the connection of said generator to said circuit and when deenergized to effect the disconnection of said generator from said circuit and a control device for controlling the energization of said master relay, means responsive to the voltage of said generator for effecting the deenergization of said master relay independently of said control device when a predetermined abnormal generator voltage occurs, means responsive to the current output of said generator, and a lockout relay controlled jointly by said voltage and current responsive means for effecting the deenergization of said master relay when a predetermined abnormal voltage occurs while the current output of the generator is above a predetermined value.

7. In combination, an automatic generating station, means normally responsive to a predetermined voltage of said station for effecting the shutting down of said station and for preventing the automatic restarting thereof when said predetermined voltage occurs under certain operating conditions of said station and for effecting only the shutting down of said station when said predetermined voltage occurs under certain other operating conditions of said station, and means responsive to a predetermined abnormal condition of said station for effecting the operation of said voltage responsive means while the station voltage is below said predetermined voltage.

8. In combination, an automatic generating station, means normally responsive to a predetermined abnormal voltage of said station, means responsive to a predetermined abnormal condition of said station for causing said voltage responsive means to respond to a lower station voltage, means responsive to the current of said station, and means controlled by said voltage responsive means and said current responsive means for effecting the shutting down of said station in response to the operation of said voltage responsive means when the current of the station is below a predetermined value and for effecting the shutting down and locking out of said station in response to the operation of said voltage responsive means when the current of said station is above a predetermined value.

9. In combination, an electric circuit, a source of current connected thereto, a relay responsive to the voltage of said source, an impedance in series with said relay, means responsive to the current output of said source, means controlled by said relay for effecting the disconnection of said source from said circuit when a predetermined abnormal source voltage occurs under predetermined current conditions, means responsive to a predetermined abnormal condition of said source for short-circuiting said impedance to effect the operation of said relay in response to normal source voltage, and means controlled by said relay and said current responsive means for effecting the disconnection of said source from said circuit and for preventing the reconnection of said source to said circuit when the operation of said relay is effected by the normal voltage of said source.

10. In combination, an electric circuit, a generator connected to said circuit, a relay connected across said generator, an impedance in series with each relay whereby said relay responds only to predetermined abnormal voltages of said generator, means responsive to the exciting current of said generator for short-circuiting said impedance when the generator field current is below a predetermined value whereby said relay responds to a lower generator voltage, means responsive to the current through said generator, and means controlled by said relay and said current responsive means for effecting the disconnection of said generator from said circuit in response to the operation of said relay when the current through said generator is below a predetermined value and for effecting the disconnection of said generator from said circuit and for preventing the reconnection thereof to said circuit in response to the operation of said relay when the current through said generator is above a predetermined value.

In witness whereof, I have hereunto set my hand this fourth day of February, 1929.

BARCLAY F. MEADOR.